June 3, 1952 — H. J. BARGEHR — 2,598,750
VEHICLE PARKING SYSTEM
Filed March 2, 1948 — 7 Sheets-Sheet 1

Inventor:
Herman J. Bargehr

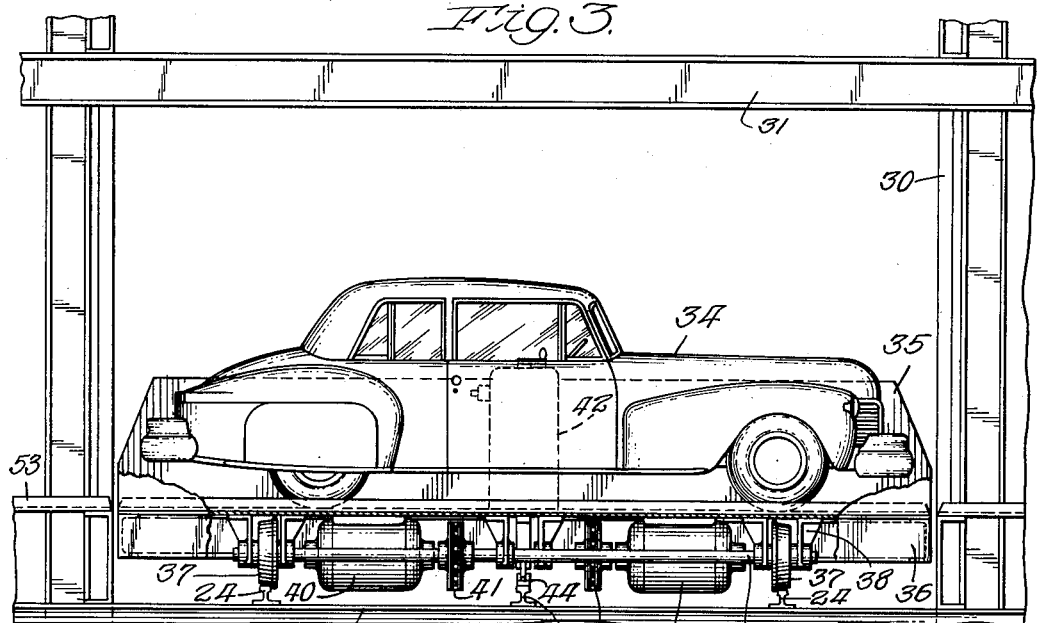
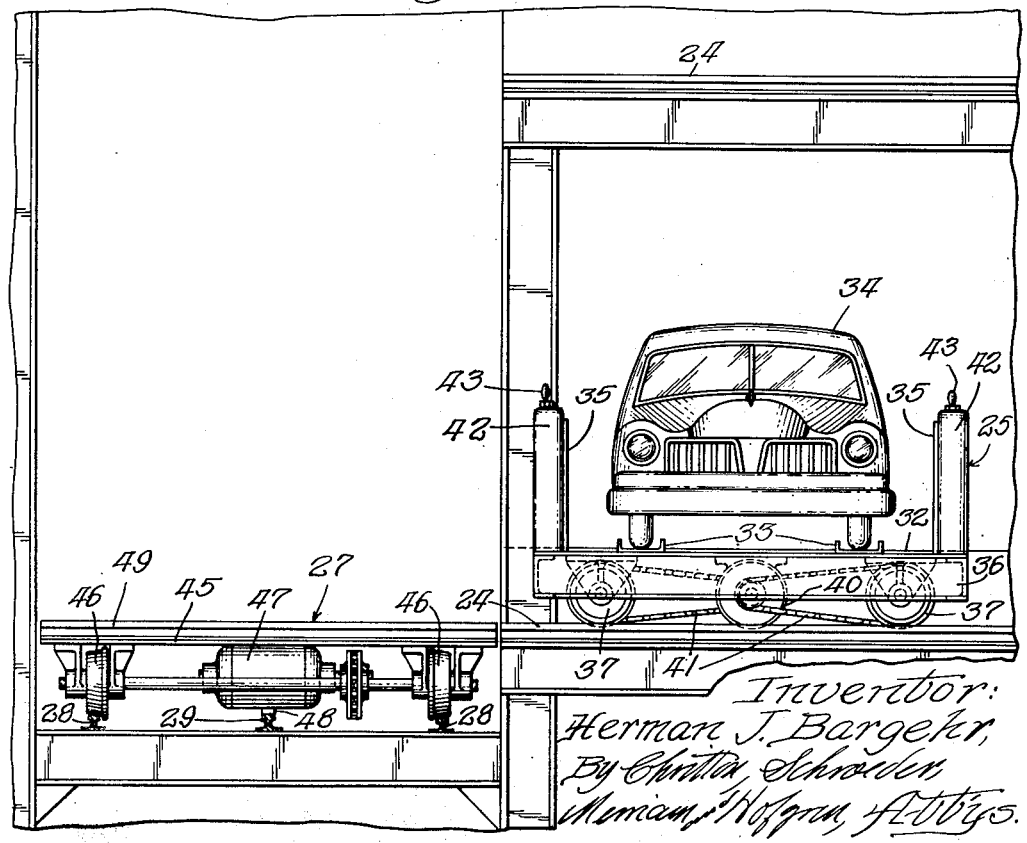

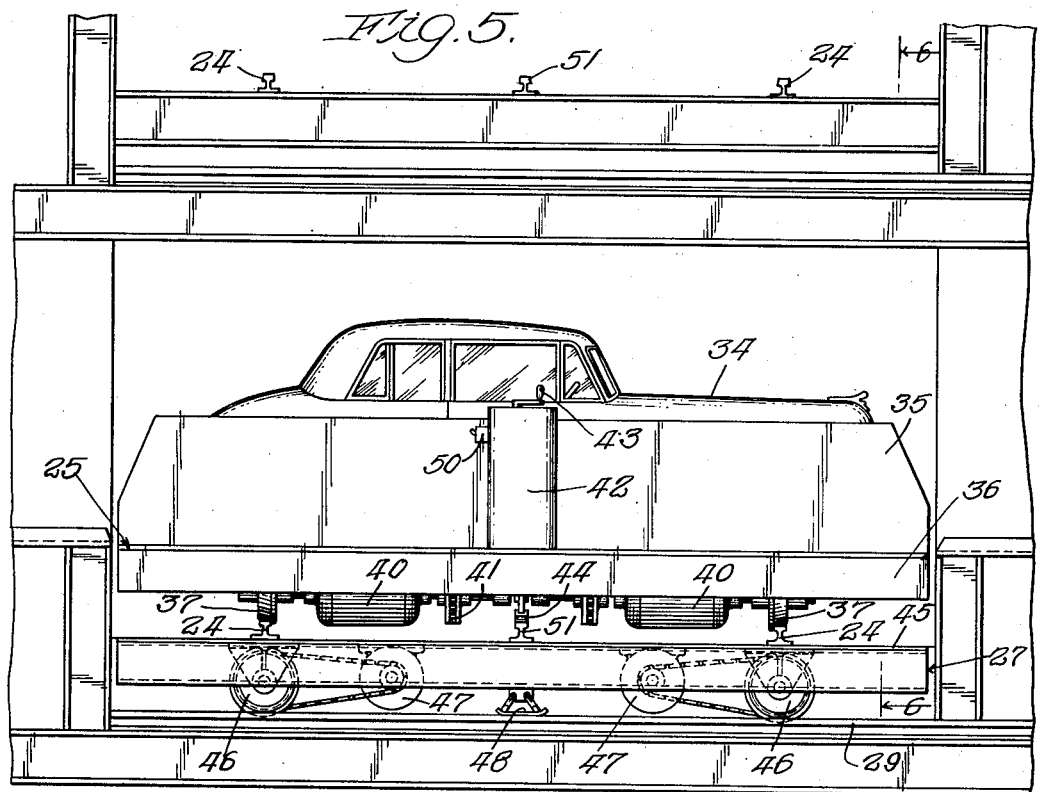
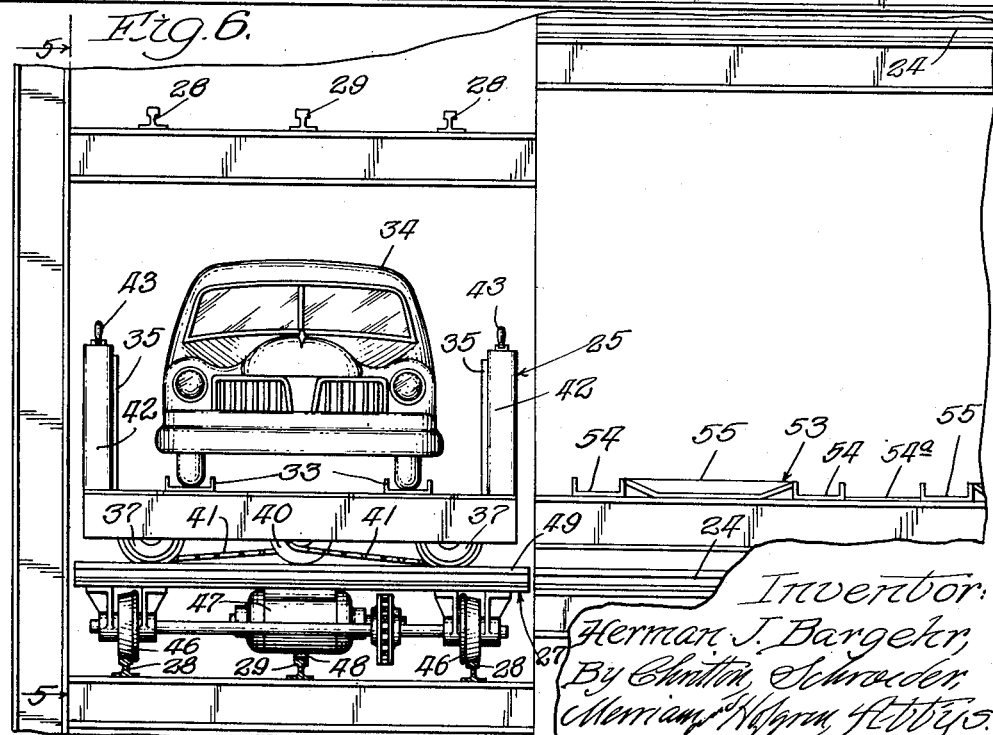

June 3, 1952 H. J. BARGEHR 2,598,750
VEHICLE PARKING SYSTEM
Filed March 2, 1948 7 Sheets-Sheet 5
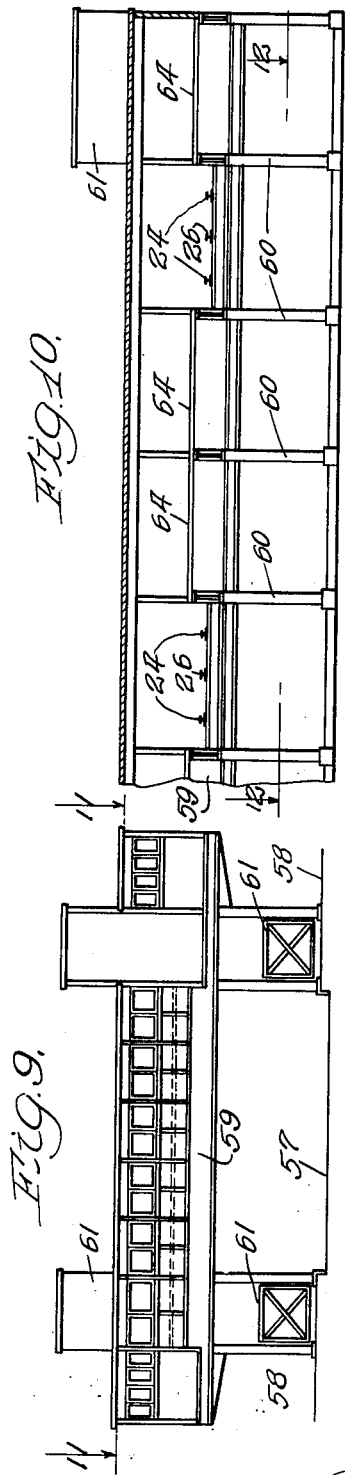
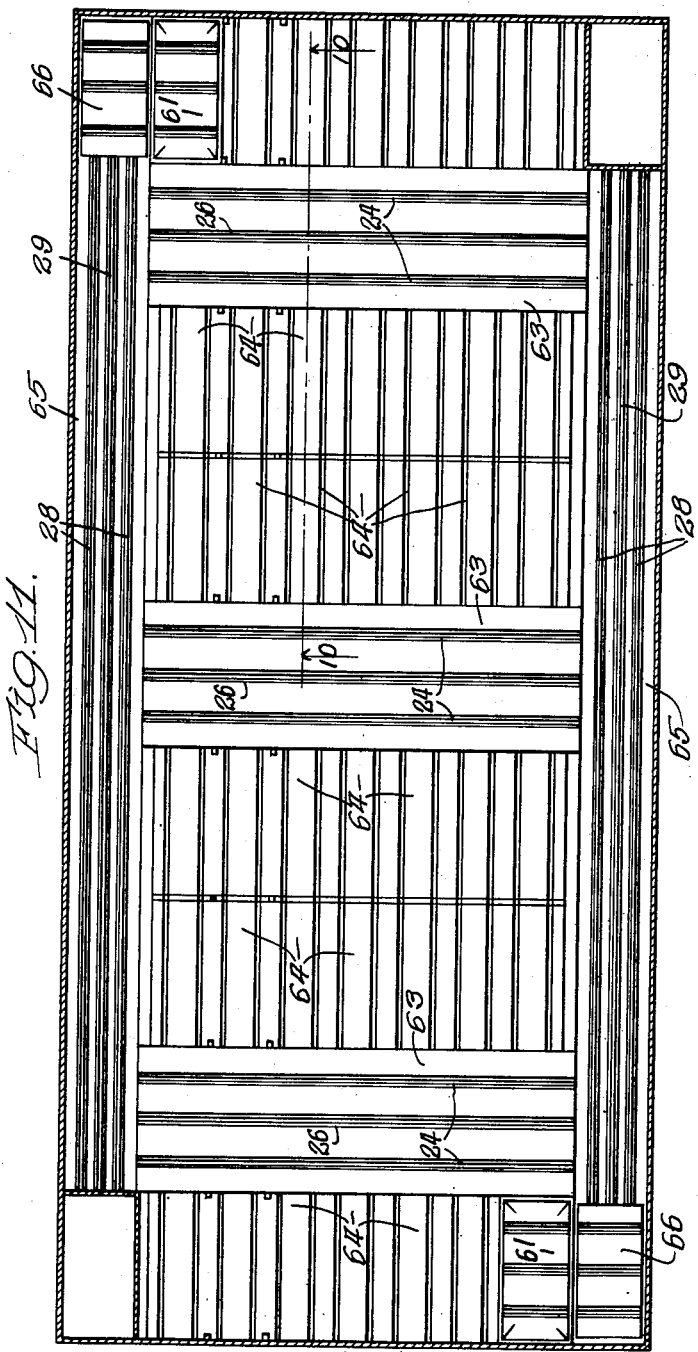
Inventor:
Herman J. Bargehr,
By Christy, Schroeder, Merriam & Holguin,
Attys.

June 3, 1952  H. J. BARGEHR  2,598,750
VEHICLE PARKING SYSTEM
Filed March 2, 1948  7 Sheets-Sheet 6
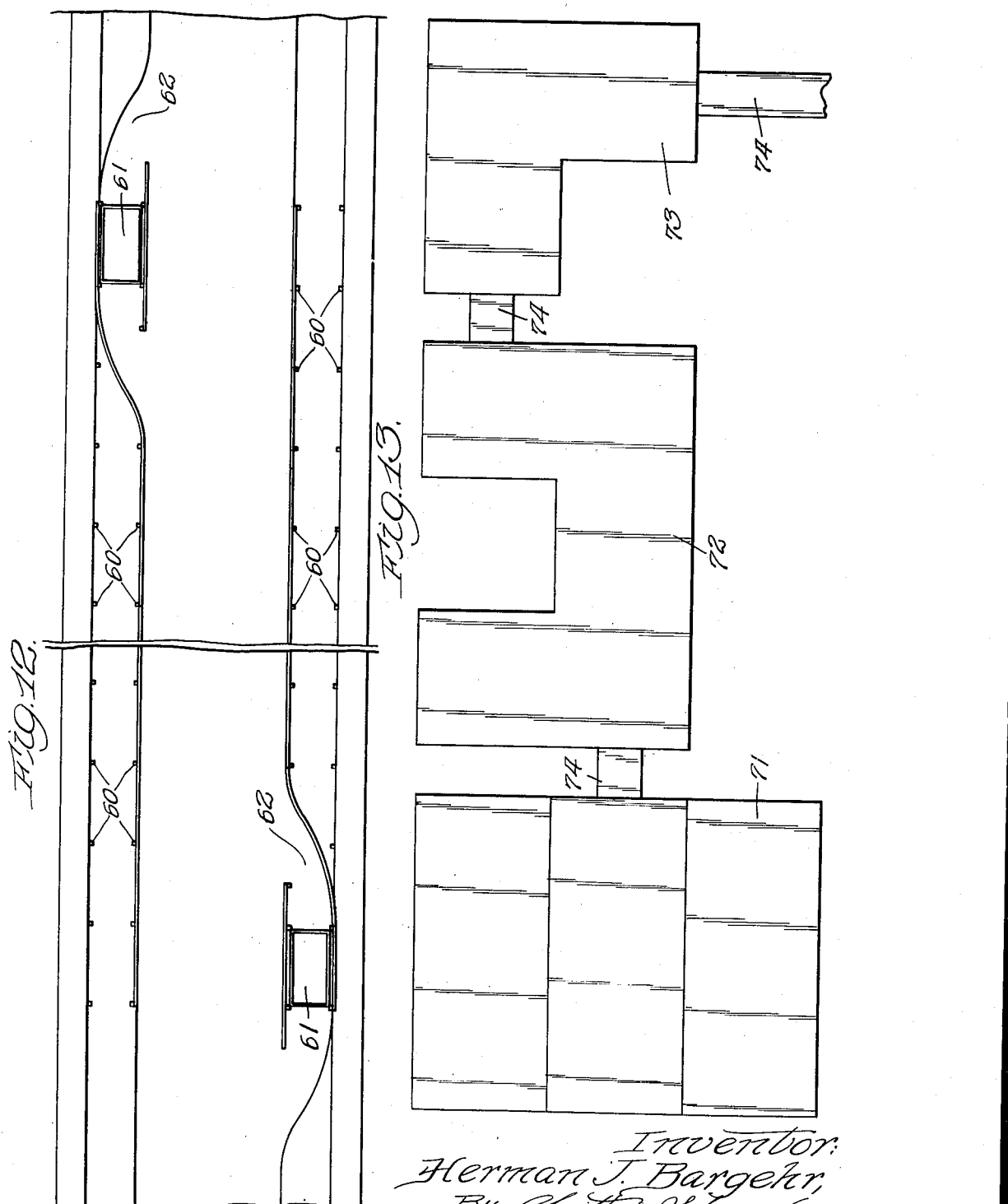

June 3, 1952  H. J. BARGEHR  2,598,750
VEHICLE PARKING SYSTEM
Filed March 2, 1948  7 Sheets-Sheet 7
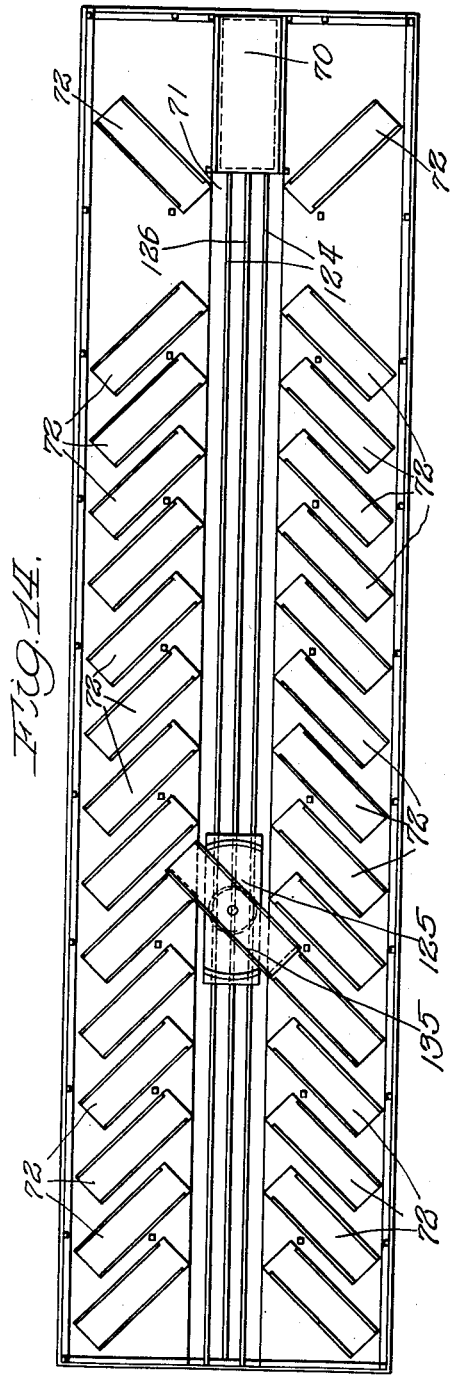
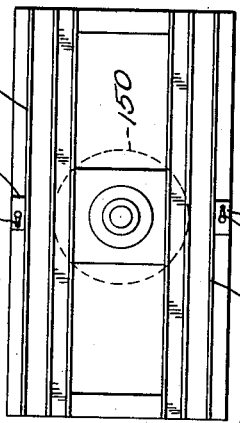
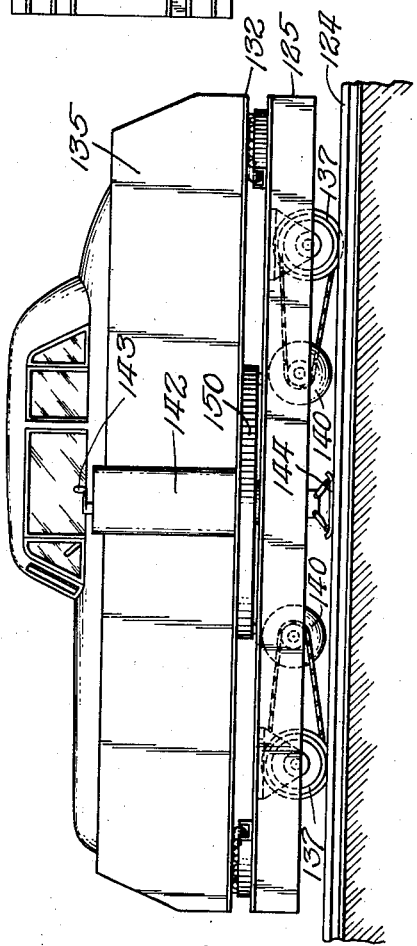
Inventor:
Herman J. Bargehr
By Christy, Schroeder, Merriam & Hofgren
Attys.

Patented June 3, 1952

2,598,750

UNITED STATES PATENT OFFICE 2,598,750

VEHICLE PARKING SYSTEM

Herman J. Bargehr, Chicago, Ill.

Application March 2, 1948, Serial No. 12,563

1 Claim. (Cl. 214—16.1)

This invention relates to a vehicle parking system, and relates particularly to such a system wherein the vehicles are transferred to and from the parking stalls by auxiliary transfer means.

In the present types of parking systems, much space is wasted as the vehicles, such as automobiles, are ordinarily driven to and from the parking stalls. Parking lots are particularly wasteful of space as here the parking is done at a single level and requires wide aisles for turning and maneuvering the vehicles. These disadvantages make the use of parking lots impractical in high rent areas. There is also much danger of damage to the vehicles either by accidental collision or by neglect of the attendants. Even where floor parking is used in buildings, the vehicles are ordinarily transferred to a particular floor on an elevator and then driven to an empty stall. This arrangement, likewise, results in considerable space being wasted as wide aisles must be maintained and there is constant danger of damage to the automobiles. Both parking lots and buildings require many attendants during rush hours and considerable delay in parking the vehicles is encountered.

The present invention successfully overcomes all the disadvantages presented above. One of the features of the present invention is the provision of an improved vehicle parking system where each vehicles is transported to its stall so that wide aisles, turntables and the like are eliminated; another feature of the invention is the provision of such a parking system wherein a maximum number of vehicles may be parked in any given space and this space may be of any desired shape; another feature of the invention is the provision of a vehicle parking system wherein the vehicle is transported laterally by a transfer car to and from its stall so that the transfer car can travel in a straight line; a further feature of the invention is the provision of such a parking system wherein a series of tracks are provided for the transfer car and the transfer car is transported to a track by a sub car operating on its own track; still another feature of the invention is the provision of such a system wherein both the transfer car and the sub car are controlled by an operator from inside the vehicle; a further feature of the invention is the provision of such a system wherein a number of floors are provided interconnected by an elevator so that a vehicle resting on a transfer car may be carried from the ground floor up the elevator to the desired stall by means of the transfer car, with these series of floors being arranged over a roadway or similar area if desired; still another feature is the provision of such a parking system wherein one elevator is used to deliver a vehicle to its stall while a second elevator is used to deliver a vehicle from its stall; a still further feature of the invention is the provision of a parking system comprising a transfer car adapted to transport a vehicle together with a series of stalls arranged adjacent the path of the transfer car and at an angle thereto with the vehicle supporting portion of the transfer car being turnable in an arc in order that the vehicle may be transferred to a stall on either side of the path of travel of the transfer car. Other features and advantages of the invention will become apparent from the following description of certain embodiments of the invention taken in conjunction with the accompanying drawings.

Of the drawings:

Fig. 3 is an elevation partially in section of a transfer car and associated structure with a vehicle on the transfer car.

Fig. 4 is a sectional elevation of a sub car, a transfer car and a vehicle on the transfer car, together with associated structure.

Fig. 5 is a side elevation partially in section of a vehicle on a transfer car and the transfer car on a sub car together with the associated structure, said elevation being taken along line 5—5 of Fig. 6.

Fig. 6 is a sectional elevation taken along line 6—6 of Fig. 5.

Fig. 9 is an elevation of a parking system wherein a parking floor is arranged above a public or semi-public roadway or the like.

Fig. 10 is a semi-diagrammatic vertical section through a portion of the parking system of Fig. 9 and taken along the line 10—10 of Fig. 11.

Fig. 11 is a section taken along line 11—11 of Fig. 9.

Fig. 12 is a section taken along line 12—12 of Fig. 10 but shown in reduced scale.

Fig. 13 is a diagrammatic plan view showing how spaced areas of regular and irregular shape may be employed and connected together in a single parking system.

Fig. 14 is a semi-diagrammatic floor plan of another embodiment of the invention showing a modified form of a transfer car.

Fig. 15 is a side elevation of the transfer car of Fig. 14 with a vehicle thereon.

Fig. 16 is a plan view of the vehicle-receiving surface of the transfer car of Fig. 15.

Figure 1:
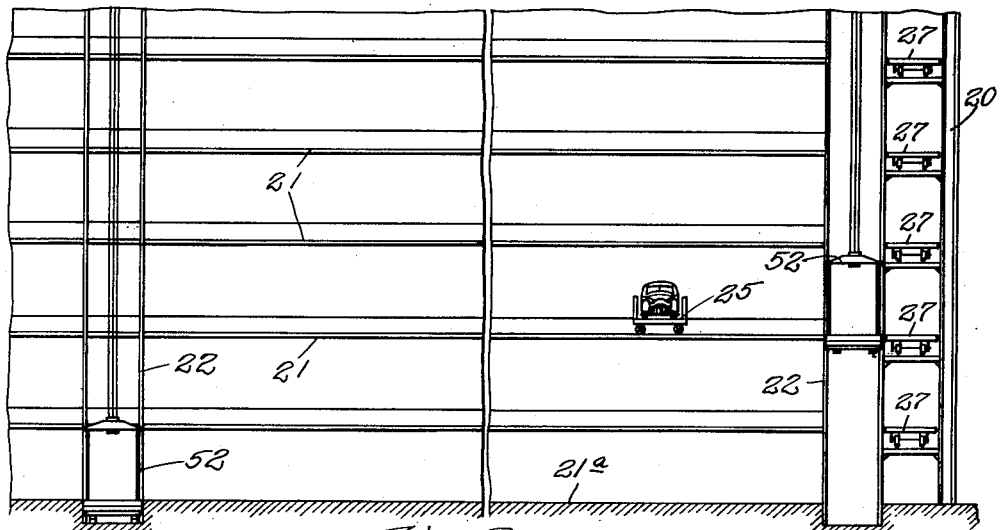
Fig. 1 is a fragmentary sectional elevation of a structure embodying the invention taken along line 1—1 of Fig. 2.

In the present invention, the vehicle to be parked is transferred by means of a transfer car to an empty stall where it is driven from the car to the stall. This transfer car, which is self-propelled preferably by electric motors, travels on a track. In one embodiment, the transfer car remains on its parking floor and the vehicle is driven at the ground level on to an elevator where it is raised to the desired floor. The vehicle is then driven from the elevator on to the transfer car and transported to the stall. In another embodiment, the transfer car itself is driven on to the elevator and the vehicle is then driven on to the transfer car at the ground level and both the transfer car and the vehicle are carried to the desired floor by the elevator. From the elevator, the transfer car is driven over its track to a parking stall and the vehicle is then driven from the transfer car into the stall. Where there are a number of transfer car tracks on a single floor, one or more sub cars may be provided so that the transfer car may be transported on a sub car from one set of tracks to another.

The transfer car is preferably provided with wheels that operate on parallel rails forming the transfer track. The transfer car is preferably provided with an electric motor operatively connected to at least one wheel for driving the transfer car in either direction. There is also provided a second motor operatively connected to at least one wheel with this motor being used if the other motor should break down. Means are provided for energizing the motor being used to drive it in either direction with this means being operated by an attendant inside the vehicle. When a sub car is used, this sub car is provided with similar motors so that it can be driven on its track, which also preferably comprises parallel rails. When the transfer car is on a sub car, means are provided for energizing the sub car motors by an attendant inside the vehicle without energizing the transfer car motors. After the sub car has reached its destination, the transfer car motor is energized in order to operate the transfer car. The electric motors of the transfer and sub cars are supplied with power from an outside source through any means desired.

In the embodiment shown in Figs. 1 to 6, inclusive, the parking system comprises a building 20, having a series of floors 21 and a pair of elevator shafts 22. The floors are preferably of open construction including only sufficient structure to support the transfer aisles 23 and the parking stalls.

Each transfer aisle comprises a pair of parallel rails 24 upon which a transfer car 25 may travel. Each aisle is also provided with an electrified third rail 26 for supplying electric current to the transfer car. Each floor is also provided with a sub car 27 travelling on its pair of rails 28. An electrified third rail 29 is provided between the sub car rails for supplying power to the sub car.

The building 20 is preferably constructed of upright columns 30 and cross beams 31 framed into the columns.

Figure 2:
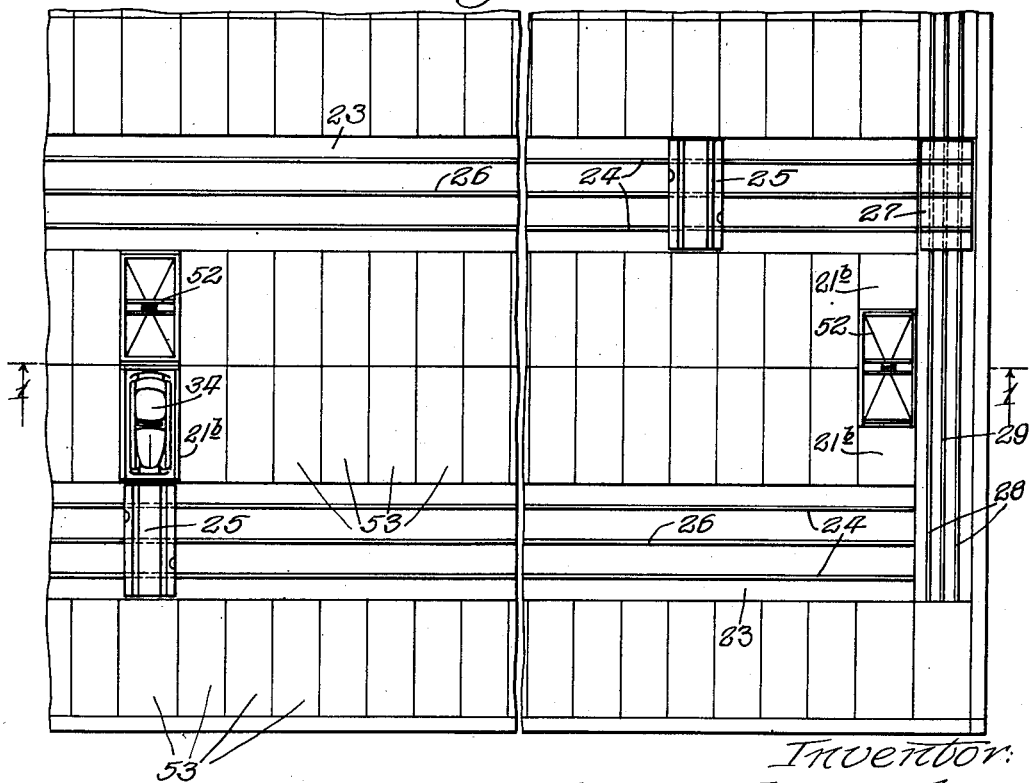
Fig. 2 is a plan view showing a floor of the structure of Fig. 1.

In the building shown in Figs. 1 and 2, the ground floor 21a is not used for permanent parking and does not contain parking stalls. This ground floor is only used for assembling the vehicles preparatory to lifting them on an elevator to parking spaces on one of the upper floors. In this embodiment, the vehicle is driven directly on to an elevator 52 and then raised to the proper floor. Each transfer car aisle 23 is provided with its transfer car 25 and the transfer car ordinarily remains in its aisle at all times. The vehicle, such as an automobile, 34 is driven from the elevator on to a transfer car and is then transported to the desired parking stall 53. In the floor plan shown in Fig. 2, the automobile may be driven either forwardly or backwardly on to either of two transfer cars 25. In order to permit this movement, the sections of floor 21b at one or both longitudinal sides of the elevator shaft are provided in the form of a driveway over which the vehicle may be driven. The elevator shaft at the left-hand side of Fig. 2 has only one such driveway 21b as the elevator 52 is located adjacent one transfer aisle 23. The elevator shaft at the right-hand side of Fig. 2 has two such driveways 21b as here the elevator shaft is located substantially midway between two parallel transfer aisles 23. Fig. 1 is shown in broken section and Fig. 2 is shown in broken plan as the floors may be extended to include any available area and may be arranged in any desired shape. Where the parking floors are particularly large, it may be desirable to transport a transfer car to another transfer aisle. Sub cars 27 operating on tracks 28 are provided for this purpose. Where sub cars are employed, a transfer car may be driven on to a sub car and the sub car then moved to another transfer aisle so that the transfer car may be operated in this aisle.

Each transfer car 25 comprises a platform 32 having secured to the top surface thereof a pair of parallel inverted channels 33. These channels 33 are used to support the vehicle, such as an automobile 34. The vehicle is driven from the elevator on to a transfer car so that the wheels of the vehicle rest on the channels 33. Each side of the transfer car is provided with upstanding guards 35, preferably formed of sheet metal or the like. The bottom of the platform 32 is braced with steel beams 36 and is supported by four wheels 37 each mounted in a bearing structure 38 near a corner of the transfer car. The pair of wheels at each side of the car is connected by an axle 39. Mounted beneath the platform 32 are a pair of electric motors 40 for driving the transfer car. Each motor 40 is operatively connected through a chain drive 41 to an axle 39. Thees motors are arranged so that one may be energized to drive the transfer car in either direction while the other motor is kept in reserve for possible emergency use. The energization of the motor being used is controlled by means of a control box 42 having a rheostat and switch therein, which is operated by a control handle 43. The rheostat, switch and control handle are so arranged that when the handle is moved in one direction, the operating motor is energized to drive the car and when the handle is moved in the other direction, the motor is energized to drive the car in the opposite direction. The transfer car is provided with two of these control boxes 42 and handles 43 and they are so located that when a vehicle is driven on to the transfer car, an attendant within the vehicle may easily operate one of the handles from the driver's seat. The motors 40 are supplied with electricity by a contact member 44 adapted to make a sliding contact with the electrified third rail 26.

Each sub car 27 comprises a platform 45, wheels 46 and motors 47. These motors drive the sub car in the same manner as has been described in connection with the motors 40 for the transfer car. The wheels 46 operate on the rails 28 and the motors 47 are energized by a sliding contact member 48 on the electrified third rail 29. The top of the platform 45 is provided with a pair of rails 49 adapted to be aligned with the transfer car rails 24, as shown in Fig. 4, so that the transfer car may be driven on to the sub car and driven from the sub car. When the transfer car 25 is in place on the sub car 27, the control box 42 and handle 43 are used to energize the motors of the sub car. This is accomplished by providing a selector switch 50 on each control box 42 in a position easily accessible from the interior of the vehicle. When the selector switch is turned to a position so that a sub car motor is energized by the control handle 43, power is obtained from the sub car third rail 29 through the contact member 48 to the control box 42 and back to the sub car motor 47. Electrical contact between the transfer car and sub car is maintained by a third rail 51 on the sub car platform 45 and the transfer car contact member 44.

As shown in Fig. 6, the vehicle, such as an automobile 34, is carried on the transfer car 25 so that it extends transversely to the direction of travel of the transfer car. The sub cars 27 carry the transfer cars so that transfer car extends laterally to the direction of travel of the sub car. Thus, the sub car always travels in substantially straight lines and the transfer car also travels in substantially straight lines. The rails 24 upon which the transfer car operates are depressed below the level of the parking stalls 53 so that the vehicle-retaining surface of the car may be brought in substantial alignment with the vehicle-receiving surface of the stall. The rails 28 upon which the sub car operates are depressed beneath the transfer car rails 24 so as to bring the rails 49 that are located on top of the sub car in substantial alignment with the rails 24 on which the transfer car operates.

When a vehicle such as an automobile is to be parked, the automobile is driven by an attendant on to the elevator at the ground floor level and elevated to the desired floor. The vehicle is then driven from the elevator on to a transfer car and transported to a parking stall. After the vehicle has been removed from the elevator, the elevator will be used to pick up other vehicles either incoming or outgoing. The elevator platform is preferably equipped with two parallel channels in alignment with those on the transfer car and these channels serve to guide the wheels of the vehicle and support the vehicle. In this embodiment, each transfer car ordinarily operates in its aisle to transport vehicles from an elevator to a parking stall and back again. Each transfer car will be operated only on its own floor and ordinarily in its own aisle. A transfer car may, however, be transported by a sub car to other units or to separate buildings.

The parking stalls may be in any form desired. As shown, however, a parking stall 53 comprises a pair of parallel channels 54 adapted to receive the wheels of the automobile or other vehicle and an oil tray 55 is located between each pair of channels 54, which is employed to catch oil, water, or the like, dripping from the automobile and prevent its falling on to the automobile on the floor below. These oil trays may be removable for cleaning or may be provided with a drain and a flushing system, if desired. Between each pair of stalls there is provided a walkway 54a preferably of open work steel.

In the embodiment of the invention that has been described, a series of transfer aisles and a pair of elevators are used. The very simplest construction, however, would be one elevator and one transfer aisle with the parking stalls arranged on opposite sides of the aisle. In this arrangement, sub cars would not be necessary as the transfer car could be driven directly from the elevator on to the transfer car rails of the transfer aisle. The employment of the sub cars is optional and is only used when it is desired to transport a transfer car to another transfer aisle in the same or separate interconnected buildings.

Figure 7:
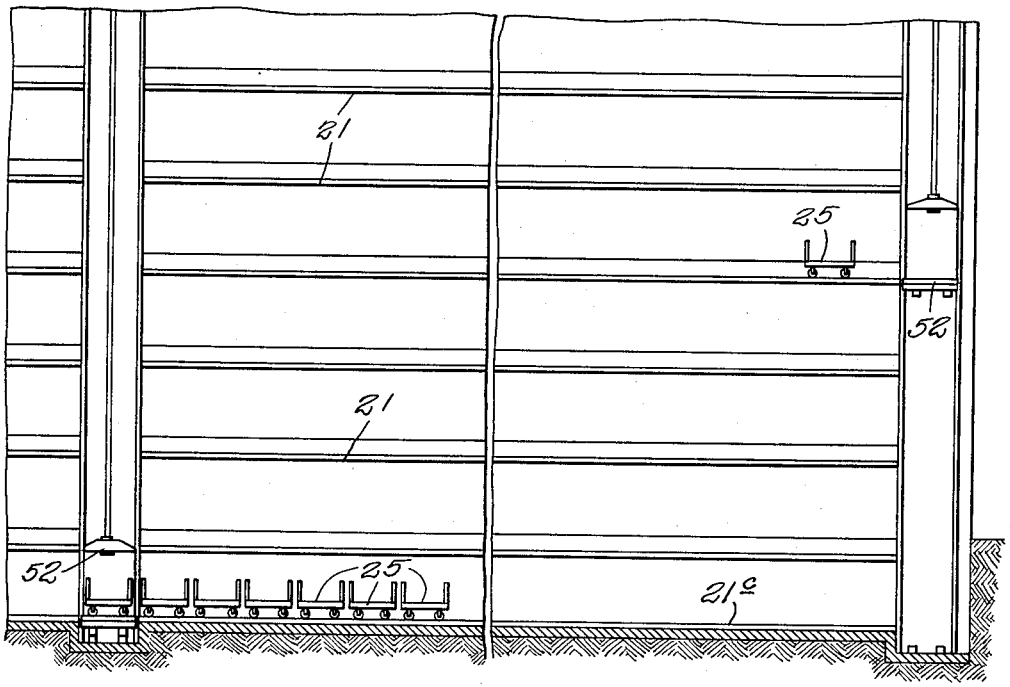
Fig. 7 is a view similar to Fig. 1 but showing another embodiment of the invention.
Figure 8:
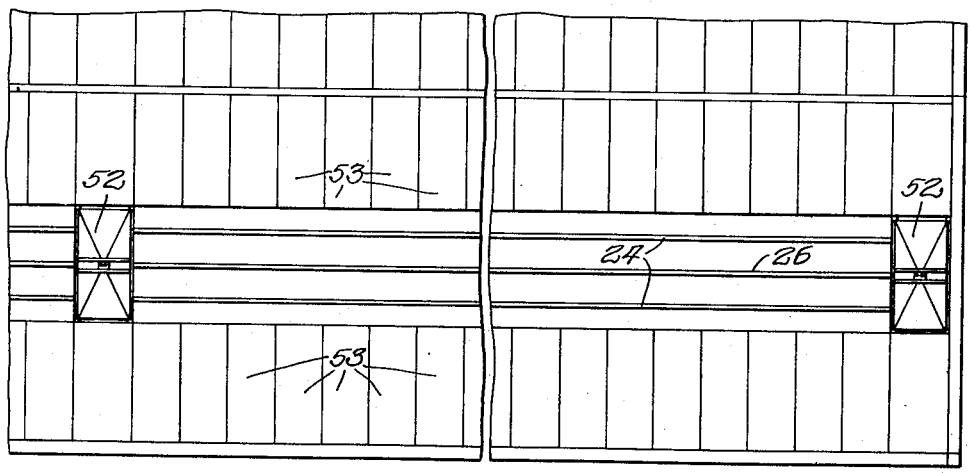
Fig. 8 is a fragmentary plan view of a parking floor of the embodiment of Fig. 7.

In the embodiment of the invention shown in Figs. 7 and 8, inclusive, the transfer cars 25 are carried on an elevator 52. In this embodiment, the transfer cars are preferably stored in a basement 21c as shown in Fig. 7. When a vehicle is to be parked a transfer car is driven on to an elevator and raised to the ground level. The vehicle is then driven on to the transfer car and both the transfer car and the vehicle are raised by the elevator to the desired floor. When this floor has been reached, the transfer car with the vehicle is driven from the elevator on to the transfer car tracks 24 and to a parking stall 53. The vehicle is then driven from the transfer car on to the stall. The transfer car may then be returned to the basement level 21c by the same or a separate elevator. The transfer car may also be used to pick up an outgoing vehicle on the same floor and transport it to the ground level. After delivering the vehicle, the transfer car may then be returned to the basement level 21c. In order that the delivery and pick up may be as rapid as possible, it is preferred that at least two elevators be used as shown in Figs. 7 and 8 so that one elevator may be used to handle the incoming vehicles while the other elevator may be used to handle the outgoing vehicles. In this embodiment, it is preferred that the ground level of the building be used for assembling vehicles preparatory to raising them to the upper floors for more permanent parking. This ground floor may also be used for the temporary storage of outgoing vehicles that are to be driven away by the owners.

In the embodiment of the invention shown in Figs. 9 to 12, inclusive, the parking system is shown located over a public or semi-public roadway 57 or similar open space. This roadway may be flanked by sidewalks 58. In the embodiment shown, only one parking floor 59 is illustrated. It is believed obvious, however, that as many parking floors could be used as desired as is illustrated, for example, in Fig. 1.

The parking floor is supported on spaced columns 60 arranged on either side of the roadway, as shown in Fig. 10. On opposite sides of the roadway 57 there is located an elevator 61 with a driveway 62 leading to and from each elevator so that vehicles may be driven from the roadway on to the elevator.

One type of floor plan for the parking floor 59 is shown in Fig. 11. This floor plan includes three parallel transfer aisles 63 with parking stalls 64 arranged on either side of each transfer aisle. The transfer aisles are connected at their ends to a pair of sub car aisles 65 over which a sub car 66 is intended to operate. Each transfer aisle is provided with car rails 24 and an electrified third rail 26 while each sub car aisle is provided with similar car rails 28 and third rail 29.

In using the parking system shown in Figs. 9 to 12, inclusive, a vehicle, such as an automobile, is driven on to a transfer car on the elevator 61. When the elevator has been raised to the parking floor, the transfer car is moved on to the sub car 66 and the sub car is moved into alignment with the desired transfer aisle 63. The transfer car is then driven along the transfer aisle until it is aligned with an empty parking stall. The automobile may then be driven on to the stall. The transfer car is then driven over to a sub car waiting on the opposite sub car aisle 65 and returned to the other elevator for transportation back to the ground level. The driveway 62 leading to the elevator 61 may be provided with a signaling device, if desired, which when contacted by an approaching vehicle will indicate to the operator that the vehicle is approaching. With this arrangement, a minimum of delay will be encountered.

Although in Fig. 11 only three transfer aisles are shown, it is believed obvious that any number can be employed depending upon the size of the available area and the amount of parking space desired.

The diagrammatic floor plan of Fig. 13 illustrates how spaced buildings 71, 72 and 73 may be employed in a single parking system. Here the floors of the buildings are connected by bridges 74 or tunnels, if desired, with these bridges or tunnels containing either transfer aisles or sub car aisles. With this arrangement, the vehicle may be received in one building and transferred to a parking space in another interconnected building. Fig. 13 also illustrates how buildings of varying shapes and sizes may be employed in the parking system.

In the embodiment shown in Figs. 14 to 16, inclusive, the parking system comprises an elevator 70, a transfer aisle 71 communicating directly therewith and a series of parking stalls 72 on either side of the transfer aisle 71. Each parking stall 72 is arranged at an angle to the transfer aisle 71 with all stalls on one side of the aisle being substantially parallel to each other. The transfer car 125 is provided with the usual motors 140 and contact member 144 adapted to contact the third rail 126. The wheels 137 roll on the parallel rails 124 in order to move the transfer car along the transfer aisle. The transfer car 125 is provided with a platform 132 and the usual side guards 135. One of the motors 140 is energized through a control box 142 and a control handle 143. The platform 132 is mounted on the transfer car 125 so that it may be swung in an arc as shown in Fig. 14. The platform 132 is mounted for rotation on a supporting structure 150. With this arrangement, the platform 132 may be rotated until it is arranged at an angle to the rim of the transfer car 125 and the vehicle driven directly from the platform on to a parking stall 72. As the platform 132 may be swung to either side of the transfer car, the vehicle may be parked on either side of the transfer aisle. As shown in Fig. 16, the platform 132 is provided with a pair of spaced channels 133, which serve to support the vehicle. This embodiment is of the greatest advantage when the available space is too narrow for the previously described parking systems.

The parking system described herein occupies a minimum of space and the delivery of vehicles to and from the parking stalls is quite rapid. The building which is used may be formed of standard units and is preferably of skeleton construction without outside walls or solid floors. The number of elevators that are used may be increased or decreased and may be changed to various locations without interfering with parking operations or loss of parking stalls. In the present parking system, the arrangement of the elevators, transfer aisles and sub car aisles may be altered very easily when desired. In order to increase the number of elevators it will only be necessary to remove track sections to provide one or more new elevator shafts. When an elevator shaft is to be closed, it is only necessary to bridge the elevator shaft on each floor by extending the track sections across the elevator shaft. Where it is desired to install a new elevator shaft through a former parking stall, it will only be necessary to remove the desired stalls. Similarly, when such an elevator shaft is to be removed, it will only be necessary to extend one or more parking stalls across the space formerly occupied by the elevator shaft.

Having described my invention as related to the embodiments set out in the accompanying drawings, it is my intention that the invention be not limited by any of the details of description unless otherwise specified, but rather be construed broadly within its spirit and scope as set out in the accompanying claim.

I claim:

A vehicle parking system comprising: a building having a series of floors; an elevator extending to all said floors; a transfer car upon which the vehicle can be placed; a series of spaced pairs of parallel rails arranged substantially parallel to each other, with the transfer car being provided with wheels adapted to engage any of said pairs of rails; a sub car upon which the transfer car can be placed; a pair of rails passing near the elevator shaft and all of said transfer car rails, with the sub car being provided with wheels adapted to engage the last-mentioned rails; a pair of rails on the sub car adapted to be aligned with each of the transfer car rails for receiving the transfer car; a series of parking stalls on each floor adjacent a pair of transfer car rails; said transfer car rails being depressed below the level of the stalls to bring the vehicle-retaining surface of the car in substantial alignment with the vehicle-receiving surface of the stalls, and the sub car rails being depressed below the level of the transfer car rails to bring the transfer car-receiving surface of the sub car in substantial alignment with the bottom of the transfer car; an electric motor on the transfer car operatively connected to at least one of the wheels for propelling the transfer car in either direction; a similar electric motor on the sub car; a control member accessible to an operator within a vehicle on said transfer car for controlling the transfer car motor and the sub car motor; apparatus including a third rail adjacent each of said transfer car rails for energizing the transfer car motor; apparatus including a third rail adjacent a sub car rail for energizing the sub car motor; apparatus including a third rail on said sub car for energizing the motor of a transfer car on said sub car; and apparatus for electrically connecting said third rail on said sub car to the sub car track third rail.

HERMAN J. BARGEHR.

REFERENCES CITED

The following references are of record in the file of this patent:

UNITED STATES PATENTS

| Number | Name | Date |
|---|---|---|
| 815,796 | Conhaim | Mar. 20, 1906 |
| 1,378,168 | Cole | May 17, 1921 |
| 1,405,278 | Carter | Jan. 31, 1922 |
| 1,567,346 | Tunison et al. | Dec. 29, 1925 |
| 1,574,822 | Koch | Mar. 2, 1926 |
| 1,814,917 | Hagman | July 14, 1931 |
| 1,969,002 | Gleichman | Aug. 7, 1934 |
| 2,190,086 | Slater | Feb. 13, 1940 |
| 2,223,962 | Mitchell | Dec. 3, 1940 |

FOREIGN PATENTS

| Number | Country | Date |
|---|---|---|
| 416,968 | Great Britain | Sept. 30, 1934 |
| 426,954 | Great Britain | Apr. 10, 1935 |